(12) United States Patent
Mestery et al.

(10) Patent No.: US 12,003,424 B2
(45) Date of Patent: Jun. 4, 2024

(54) LOAD BALANCING COMMUNICATION SESSIONS IN A NETWORKED COMPUTING ENVIRONMENT

(71) Applicant: Cisco Technology, Inc., San Jose, CA (US)

(72) Inventors: Kyle Andrew Donald Mestery, Woodbury, MN (US); Andree Toonk, Vancouver (CA); Rahim Lalani, Vancouver (CA); Ian James Wells, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/111,075

(22) Filed: Feb. 17, 2023

(65) Prior Publication Data
US 2023/0275845 A1 Aug. 31, 2023

Related U.S. Application Data

(63) Continuation of application No. 16/875,524, filed on May 15, 2020, now Pat. No. 11,588,749.

(51) Int. Cl.
*H04L 47/726* (2022.01)
*H04L 9/40* (2022.01)
(Continued)

(52) U.S. Cl.
CPC ............ *H04L 47/726* (2013.01); *H04L 45/42* (2013.01); *H04L 47/781* (2013.01);
(Continued)

(58) Field of Classification Search
CPC ..... H04L 47/726; H04L 47/728; H04L 45/42; H04L 47/78; H04L 47/781; H04L 47/80;
(Continued)

(56) References Cited

U.S. PATENT DOCUMENTS 6,675,199 B1 * 1/2004 Mohammed ........ H04L 67/1001
709/227
6,675,217 B1 * 1/2004 Dani ....................... H04L 69/40
714/4.11
(Continued)

OTHER PUBLICATIONS

Office Action for U.S. Appl. No. 16/875,524, dated Apr. 28, 2022, Mestery, "Load Balancing Communication Sessions in a Networked Computing Environment", 15 pages.

*Primary Examiner* — Jenee Holland
(74) *Attorney, Agent, or Firm* — Lee & Hayes, P.C.

(57) ABSTRACT

Techniques for load balancing communication sessions in a networked computing environment are described herein. The techniques may include establishing a first communication session between a client device and a first computing resource of a networked computing environment. Additionally, the techniques may include storing, in a data store, data indicating that the first communication session is associated with the first computing resource. The techniques may further include receiving, at a second computing resource of the networked computing environment, traffic associated with a second communication session that was sent by the client device, and based at least in part on accessing the data stored in the data store, establishing a traffic redirect such that the traffic and additional traffic associated with the second communication session is sent from the second computing resource to the first computing resource.

20 Claims, 7 Drawing Sheets

(51) Int. Cl.
| | |
|---|---|
| *H04L 45/12* | (2022.01) |
| *H04L 45/125* | (2022.01) |
| *H04L 45/42* | (2022.01) |
| *H04L 45/7453* | (2022.01) |
| *H04L 47/78* | (2022.01) |
| *H04L 47/80* | (2022.01) |
| *H04L 67/10* | (2022.01) |
| *H04L 67/1027* | (2022.01) |
| *H04L 67/1097* | (2022.01) |
| *H04L 67/146* | (2022.01) |

(52) U.S. Cl.
CPC .......... *H04L 47/801* (2013.01); *H04L 63/166* (2013.01); *H04L 67/1097* (2013.01)

(58) Field of Classification Search
CPC .. H04L 47/801; H04L 63/166; H04L 67/1097
See application file for complete search history.

(56) References Cited

U.S. PATENT DOCUMENTS

| | | | |
|---|---|---|---|
| 6,763,372 B1* | 7/2004 | Dani | H04L 12/1827 709/204 |
| 8,180,983 B1 | 5/2012 | Jernigan | |
| 8,245,285 B1 | 8/2012 | Ravishankar | |
| 8,868,495 B2 | 10/2014 | Batterywala | |
| 8,972,602 B2 | 3/2015 | Mithyantha | |
| 9,419,942 B1* | 8/2016 | Buruganahalli | H04L 63/06 |
| 9,485,143 B1 | 11/2016 | Vachharajani et al. | |
| 9,503,485 B1* | 11/2016 | Koum | H04L 65/1046 |
| 9,591,084 B1 | 3/2017 | Egorov | |
| 9,807,016 B1* | 10/2017 | Sarangapani | H04L 67/02 |
| 10,003,616 B2 | 6/2018 | Buruganahalli et al. | |
| 10,230,566 B1* | 3/2019 | Jain | H04L 63/0884 |
| 10,237,078 B2 | 3/2019 | Prince et al. | |
| 10,248,345 B1 | 4/2019 | Dickson | |
| 10,263,868 B1* | 4/2019 | Baldi | H04W 12/02 |
| 10,305,853 B2 | 5/2019 | Lafragette | |
| 10,826,879 B2* | 11/2020 | Sharifi Mehr | H04L 63/205 |
| 2002/0184287 A1 | 12/2002 | Nunally | |
| 2003/0065811 A1* | 4/2003 | Lin | H04L 47/728 709/238 |
| 2003/0101245 A1 | 5/2003 | Srinivasan | |
| 2007/0088706 A1 | 4/2007 | Goff | |
| 2008/0123855 A1 | 5/2008 | Thomas | |
| 2011/0236022 A1* | 9/2011 | Garikapati | H04L 41/12 398/79 |
| 2013/0326071 A1 | 12/2013 | Almog | |
| 2014/0181184 A1* | 6/2014 | Cooney | H04L 67/1006 709/203 |
| 2014/0189053 A1 | 7/2014 | Shi | |
| 2014/0215590 A1* | 7/2014 | Brand | G06F 9/5072 726/6 |
| 2014/0301388 A1 | 10/2014 | Jagadish et al. | |
| 2015/0186214 A1 | 7/2015 | Gladwin | |
| 2015/0189010 A1* | 7/2015 | van Bemmel | H04L 67/1014 709/203 |
| 2015/0229481 A1* | 8/2015 | Prince | H04L 67/56 713/175 |
| 2015/0381557 A1 | 12/2015 | Fan | |
| 2016/0048408 A1 | 2/2016 | Madhu et al. | |
| 2016/0078758 A1* | 3/2016 | Basalamah | G08G 1/0141 701/118 |
| 2016/0191296 A1 | 6/2016 | Scharber | H04L 47/125 709/223 |
| 2016/0323186 A1* | 11/2016 | Dillon | H04L 47/2441 |
| 2016/0359807 A1* | 12/2016 | Buruganahalli | H04L 63/1408 |
| 2017/0013000 A1* | 1/2017 | El-Moussa | H04L 63/1408 |
| 2017/0177840 A1 | 6/2017 | Srivastava et al. | |
| 2017/0316038 A1 | 11/2017 | Guionneau | |
| 2017/0324828 A1 | 11/2017 | Clavera | |
| 2018/0131621 A1* | 5/2018 | Wu | H04L 41/145 |
| 2018/0150368 A1 | 5/2018 | Lee | |
| 2018/0150541 A1 | 5/2018 | Tyercha | |
| 2018/0183882 A1 | 6/2018 | Flynn | |
| 2018/0219913 A1* | 8/2018 | Manasse | H04L 63/0428 |
| 2018/0270170 A1* | 9/2018 | Shetti | H04L 49/9005 |
| 2018/0324245 A1* | 11/2018 | Luo | H04L 61/2503 |
| 2018/0332040 A1* | 11/2018 | Chou | H04L 63/0853 |
| 2019/0116160 A1 | 4/2019 | Bhat et al. | |
| 2019/0199644 A1* | 6/2019 | Ruffini | H04L 47/18 |
| 2019/0245700 A1* | 8/2019 | Dobre | H04L 67/1097 |
| 2019/0250025 A1 | 8/2019 | Dixon, Jr. | |
| 2019/0260719 A1* | 8/2019 | Moore | H04L 63/045 |
| 2019/0288938 A1* | 9/2019 | Song | H04L 43/106 |
| 2019/0312846 A1* | 10/2019 | Taylor | H04L 63/1408 |
| 2019/0319872 A1* | 10/2019 | Adhikari | H04L 45/24 |
| 2019/0326012 A1* | 10/2019 | Witt | G16H 40/63 |
| 2019/0356694 A1* | 11/2019 | Wang | H04L 63/0823 |
| 2019/0387458 A1 | 12/2019 | Li | |
| 2020/0068049 A1 | 2/2020 | Ngo et al. | |
| 2020/0110675 A1 | 4/2020 | Wang et al. | |
| 2020/0162432 A1 | 5/2020 | Ludin et al. | |
| 2021/0218786 A1* | 7/2021 | Hernandez | H04L 67/306 |
| 2021/0359954 A1 | 11/2021 | Mestery et al. | |
| 2023/0127439 A1* | 4/2023 | Liu | H04L 47/2483 713/154 |

* cited by examiner

300

```
┌─────────────────────────────────────────────────────────────────────┐
│ ESTABLISH A FIRST COMMUNICATION SESSION BETWEEN A CLIENT DEVICE AND ONE │
│   OR MORE FIRST COMPUTING RESOURCES OF A NETWORKED COMPUTING        │
│ ENVIRONMENT, WHEREIN THE ONE OR MORE FIRST COMPUTING RESOURCES ARE  │
│    HOSTING ONE OR MORE CONTAINERS ASSOCIATED WITH THE CLIENT DEVICE │
│                                 302                                 │
└─────────────────────────────────────────────────────────────────────┘
                                   │
                                   ▼
┌─────────────────────────────────────────────────────────────────────┐
│   STORE, IN A DATA STORE ASSOCIATED WITH THE NETWORKED COMPUTING    │
│    ENVIRONMENT, MAPPING DATA INDICATING THAT THE FIRST COMMUNICATION│
│    SESSION IS ASSOCIATED WITH THE ONE OR MORE FIRST COMPUTING RESOURCES │
│                                 304                                 │
└─────────────────────────────────────────────────────────────────────┘
                                   │
                                   ▼
┌─────────────────────────────────────────────────────────────────────┐
│ RECEIVE, AT ONE OR MORE SECOND COMPUTING RESOURCES OF THE NETWORKED │
│      COMPUTING ENVIRONMENT AND FROM A ROUTER ASSOCIATED WITH THE    │
│   NETWORKED COMPUTING ENVIRONMENT, ONE OR MORE PACKETS OF A SECOND  │
│         COMMUNICATION SESSION THAT WERE SENT BY THE CLIENT DEVICE   │
│                                 306                                 │
└─────────────────────────────────────────────────────────────────────┘
                                   │
                                   ▼
┌─────────────────────────────────────────────────────────────────────┐
│  IDENTIFY, BY THE ONE OR MORE SECOND COMPUTING RESOURCES AND BASED AT │
│   LEAST IN PART ON THE MAPPING DATA, THAT THE ONE OR MORE PACKETS ARE TO │
│       BE REDIRECTED TO THE ONE OR MORE FIRST COMPUTING RESOURCES    │
│                                 308                                 │
└─────────────────────────────────────────────────────────────────────┘
                                   │
                                   ▼
┌─────────────────────────────────────────────────────────────────────┐
│     SEND THE ONE OR MORE PACKETS TO THE ONE OR MORE FIRST COMPUTING │
│                               RESOURCES                             │
│                                 310                                 │
└─────────────────────────────────────────────────────────────────────┘
```

FIG. 3

LOAD BALANCING COMMUNICATION SESSIONS IN A NETWORKED COMPUTING ENVIRONMENT

CROSS-REFERENCE TO RELATED APPLICATION

This patent application is a continuation of and claims priority to U.S. patent application Ser. No. 16/875,524, filed May 15, 2020, which is fully incorporated herein by reference.

TECHNICAL FIELD

The present disclosure relates generally to load balancing communication sessions in a networked computing environment. More specifically, this disclosure relates to load balancing Transport Layer Security (TLS) and Datagram Transport Layer Security (DTLS) sessions with Equal-Cost Multipath (ECMP) routing and host-local Server Name Identification (SNI).

BACKGROUND

Virtual Private Networks (VPNs) make use of various protocols to encrypt traffic from a client node to a server node, and VPN traffic will generally terminate on a specific computing device. However, networked computing environments, such as cloud-based data centers, generally include multiple computing devices or server computers that execute software in order to provide clients with a broad range of resources, such as virtual machines, virtual private networks, storage, etc. Accordingly, in a networked computing environment, a specific computing device (on which VPN traffic would typically terminate) is replaced by individual software resources executing on one or more computing devices of the networked environment. These software resources may be moved between various computing devices of the networked environment in order to satisfy current demands, and VPN traffic may additionally be moved between different software units. Accordingly, there is no guarantee that VPN traffic will always terminate on the same software unit or computing device of the networked computing environment.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 illustrates a flow diagram of an example method for establishing a packet redirect for load balancing TLS and DTLS sessions.

DESCRIPTION OF EXAMPLE EMBODIMENTS

Overview

Figure 1A:
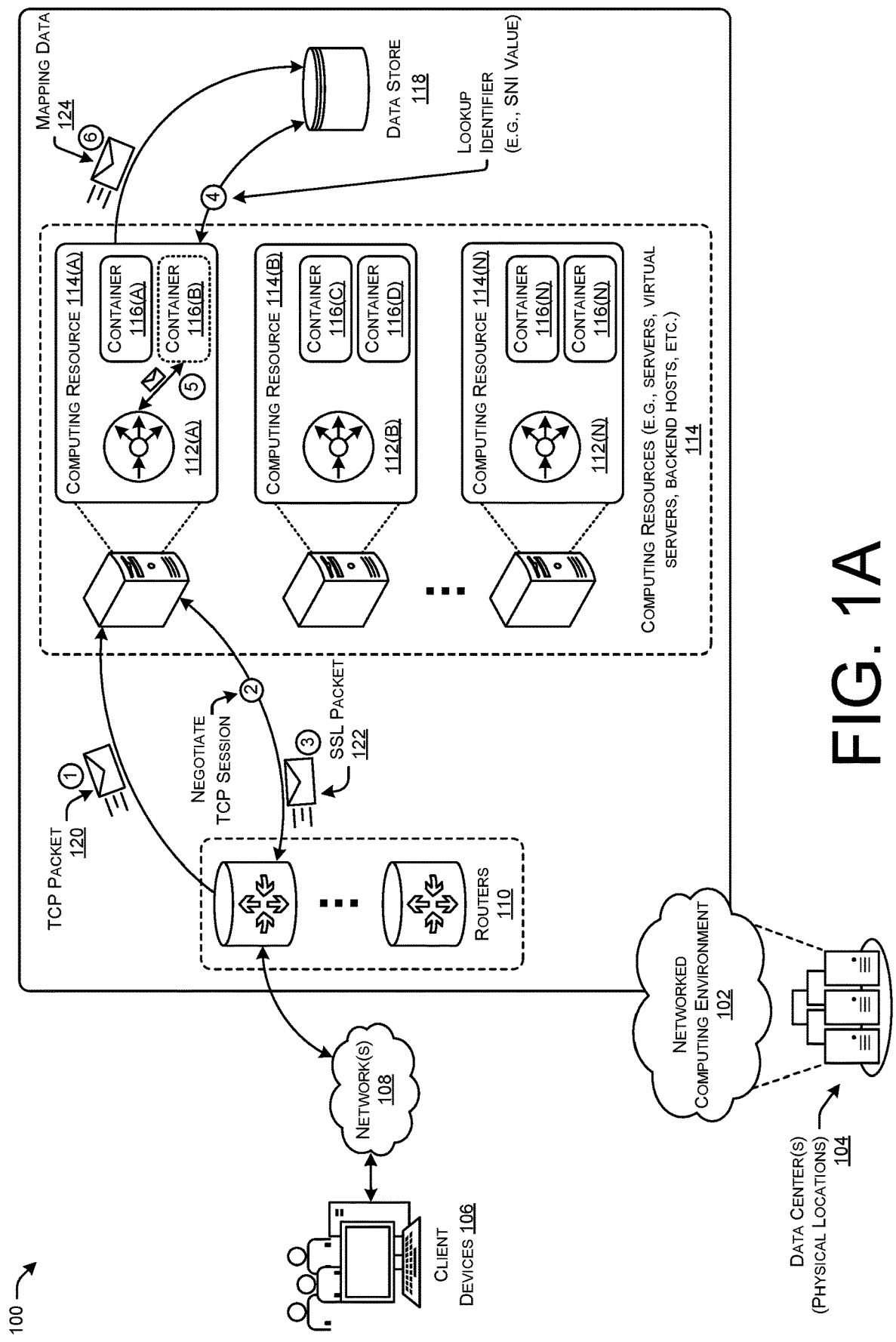
FIGS. 1A and 1B collectively illustrate a system-architecture diagram of an example networked computing environment that is performing load balancing of TLS and DTLS sessions with ECMP and host-local SNI.

This disclosure describes techniques for providing load balancing of communication sessions in a networked computing environment and, more specifically, for load balancing TLS and DTLS sessions with Equal-Cost Multipath (ECMP) routing and host-local Server Name Identification (SNI). Some of the techniques described in this disclosure may include establishing a first communication session (e.g., TLS session, TCP connection, DTLS session, UDP connection, etc.) between a client device and one or more first computing resources of a networked computing environment. The one or more first computing resources may be hosting one or more containers associated with the client device. Some of the techniques may also include storing mapping data (e.g., Server Name Identification (SNI) identifier, 5-tuple identifier, DTLS session identifier, etc.) indicating that the first communication session is associated with the one or more first computing resources. The mapping data may be stored in a data store (e.g., key-value store) that is associated with the networked computing environment.

Additionally, the techniques described herein may include receiving, at one or more second computing resources and from a router associated with the networked computing environment, one or more packets of a second communication session (e.g., TLS session, TCP connection, DTLS session, UDP connection, etc.) that were sent by the client device. The one or more packets may have been routed to the one or more second computing resources via an ECMP routing algorithm. The one or more second computing resources may also identify, based at least in part on the mapping data, that the one or more packets are to be redirected to the one or more first computing resources. Further, some of the techniques described in this disclosure may include establishing a packet redirect on the one or more second computing resources and sending the one or more packets to the one or more first computing resources.

In this way, VPN traffic that is ECMP routed to a different computing resource of the networked computing environment can be redirected and/or sent to the correct computing resource that is associated with the client device. In this way, an improvement in computing technology is achieved at least because landing TLS and/or DTLS packets on the same computing resource backend node ensures that the processing of the session can continue. Additionally, this improves the scalability of the networked computing environment by not having to introduce additional hardware resources to the networked environment to properly route the VPN traffic.

Additionally, the techniques described in this disclosure may be performed as a method and/or by a system having non-transitory computer-readable media storing computer-executable instructions that, when executed by one or more processors, performs the techniques described above.

Example Embodiments

As discussed above, Virtual Private Networks (VPNs) make use of various protocols to encrypt traffic from a client node to a server node, and VPN traffic will generally terminate on a specific computing device. For instance, Secure Sockets Layer (SSL) VPNs make use of both Transport Layer Security (TLS) and Datagram Transport Layer Security (DTLS) protocols to encrypt traffic between the client and the server, and both of these protocols should terminate on the same server node. However, networked computing environments generally include multiple computing devices or server computers that execute software, and a specific computing device on which VPN traffic would typically terminate on is replaced by individual software resources (e.g., containers, functions, virtual machines, etc.) executing on one or more computing devices of the networked environment. Because VPN traffic may be moved between different software resources, there is no guarantee that VPN traffic (including both TLS and DTLS traffic) will always terminate on the same software resource or computing device of the networked computing environment. For instance, if an edge router of the networked computing environment is routing incoming traffic according to an ECMP routing algorithm, then the edge router may send the incoming traffic to a variety of computing resources of the networked computing environment based on current demand. Additionally, it may be inefficient to provide the edge router with the software capability to associate TLS and DTLS sessions with the same client node in order to ensure that the traffic of the TLS and DTLS sessions land on the same backend computing resource.

Accordingly, this disclosure describes techniques for providing load balancing of communication sessions in a networked computing environment and, more specifically, for load balancing TLS and DTLS sessions with Equal-Cost Multipath (ECMP) routing and host-local Server Name Identification (SNI). By way of example and not limitation, a method according to the various techniques described in this disclosure may include establishing a first communication session between a client device and a first computing resource (e.g., backend node) of a networked computing environment. In some examples, the first computing resource may include a load balancer as part of its architecture and may be hosting one or more containers associated with one or more tenants, including the client device. The load balancer may route packets to the one or more containers according to an SNI load balancing algorithm (e.g., host-local SNI routing). The first communication session may comprise a TLS session, TCP session, DTLS session, UDP session, Internet Protocol Security (IPsec) session, and the like. In at least one example, the first communication session comprises a TLS session.

As used herein, the term "computing resource" may comprise one or more of a computer, server computer, virtual machine, virtual server, router, switch (e.g., top of rack switch), gateway, communication node, backend node, load balancer, and the like. Additionally, a computing resource may comprise one or more computing resources.

In some examples, establishing the first communication session may include mapping a tenant's SSL endpoint to a host name using Domain Name System (DNS) records, as well as providing DNS load balancing of these DNS records. Additionally, or alternatively, the DNS records may be used to map a tenant to an anycast IP address associated with the first computing resource, or one or more other computing resources.

In some examples, establishing the first communication session may include receiving, at the first computing resource, a first packet that was sent by the client device. The first packet may comprise a TCP packet indicating a request to establish a TLS session, or may comprise a UDP packet indicating a request to establish a DTLS session. Additionally, the first packet may have been routed to the first computing resource by a routing layer (e.g., data center edge router) of the networked computing environment according to an ECMP routing algorithm. In at least one example, the first packet may have been routed to the first computing resource based at least in part on a 5-tuple identifier associated with the first packet. In some examples, establishing the first communication session may include negotiating the first communication session (e.g., sending one or more packets back and forth between the client device and the load balancer of the first computing resource) until a first Secure Sockets Layer (SSL) packet (e.g., ClientHello message) is received by the load balancer of the first computing resource. The first SSL packet may, in at least some examples, include an identifier associated with at least one of the client device, client node, and/or the first communication session. For instance, the first SSL packet may include at least a Server Name Identification (SNI) identifier (e.g., SNI value), a DTLS session identifier (e.g., X-DTLS-Session-ID), and/or a 5-tuple identifier.

Based at least in part on receiving the first SSL packet including the identifier, the load balancer of the first computing resource may, in some examples, lookup the identifier (e.g., SNI value) in a data store (e.g., key-value store) associated with the networked computing environment. If the load balancer of the first computing resource locates or otherwise finds the identifier already stored in the data store, then the load balancer will understand which backend (e.g., other computing resource) is hosting a set of one or more containers that the client device is attempting to authenticate with. Accordingly, the load balancer of the first computing resource may appropriately redirect packets to the other computing resource. In at least one example, if the load balancer finds the identifier already stored in the data store and the identifier corresponds to the first computing resource, then the load balancer will determine that no redirect is necessary and proceed with authentication. However, if the identifier is not located or otherwise found in the data store by the load balancer, then the first computing resource may dynamically establish a new set of containers to be associated with a new tenant and/or the client device. Accordingly, this new set of containers will be responsible for handling all VPN traffic (e.g., TLS and DTLS traffic) for the new tenant and/or the client device.

In some examples, if the identifier is not found in the data store and the first computing resource dynamically establishes the new set of containers for the new tenant and/or client device (as described above), then the method may include storing, in the data store, mapping data indicating that the first communication session is associated with at least one of the first computing resource and/or the new set of containers. As noted above, the mapping data may include one or more of the SNI identifier (e.g., SNI value), the DTLS session identifier, and/or the 5-tuple identifier associated with the first communication session and/or the client device. The mapping data may appropriately associate these identifiers with the first computing resource and/or the new set of containers associated with the new tenant and/or the client device. Additionally, the data store may be accessible by all load balancers of the networked computing environment. In this way, in at least some examples, if other load balancers of one or more other computing resources (e.g., different than the one or more first computing resources) receive a packet that contains one or more of the SNI identifier, the DTLS session identifier, and/or the 5-tuple identifier, then the other load balancers may understand to redirect, or otherwise send, the packet to the load balancer of the first computing resource.

In various examples, each computing resource (e.g., backend node) of the networked computing environment may comprise one or more internet protocol (IP) addresses. For instance, each computing resource may comprise an anycast IP address that is the same across all computing resources. Additionally, each computing resource may comprise a unique IP address that is used for communications between computing resources, including redirecting packets to a specific computing resource.

The method may also include, in some instances, establishing a second communication session between the client device and a second computing resource (e.g., second backend node) of the networked computing environment. In some examples, the second computing resource may comprise one or more second computing resources and/or may be similar to the first computing resource in that the second computing resource includes a load balancer and may be hosting one or more containers associated with one or more tenants. The second communication session may comprise a TLS session, TCP session, DTLS session, UDP session, Internet Protocol Security (IPsec) session, and the like. In at least one example, the second communication session may comprise a DTLS session.

In some examples, establishing the second communication session may include receiving, at the second computing resource, a second packet that was sent by the client device. The second packet may comprise a first TCP packet indicating a request to establish a TLS session, or may comprise a first UDP packet indicating a request to establish a DTLS session. Additionally, the second packet may have been routed to the second computing resource by the routing layer (e.g., data center edge router) of the networked computing environment according to the ECMP routing algorithm. In at least one example, the second packet may have been routed to the second computing resource based at least in part on a 5-tuple identifier associated with the second packet. In some examples, establishing the second communication session may include negotiating the second communication session (e.g., sending one or more packets back and forth between the client device and the load balancer of the second computing resource) until a first DTLS packet is received by the load balancer of the second computing resource. The first DTLS packet may, in at least some examples, include an identifier that corresponds with at least one of the client device, the client node, and/or the first communication session. For instance, the first DTLS packet may include at least the Server Name Identification (SNI) identifier (e.g., SNI value), the DTLS session identifier (e.g., X-DTLS-Session-ID), and/or the 5-tuple identifier.

In some examples, based at least in part on receiving the first DTLS packet including the identifier, the load balancer of the second computing resource may identify that one or more packets of the second communication session are to be redirected to the load balancer of the first computing resource. For instance, the load balancer of the second computing resource may, in response to receiving the first DTLS packet, lookup the identifier (e.g., SNI value, 5-tuple, X-DTLS-Session-ID, etc.) in the data store. Because, as noted above, the identifier was already stored in the data store by the load balancer of the first computing resource, the load balancer of the second computing resource will understand that the packets are to be redirected to the load balancer of the first computing resource since the identifier is associated with (e.g., mapped to) the new containers established on the first computing resource.

Based at least in part on identifying that the one or more packets of the second communication session are to be redirected to the load balancer of the first computing resource, the method may include sending the one or more packets from the load balancer of the second computing resource to the load balancer of the first computing resource. Additionally, in some examples the second computing resource and/or the load balancer of the second computing resource may establish a packet redirect to automatically send one or more packets associated with the second communication session, which are received in the future by the load balancer of the second computing resource, to the load balancer of the first computing resource. The packet redirect may be setup locally on the second computing resource using something such as an Internet Protocol Virtual Server (IPVS), Linux Berkeley Packet Filter (BPF), and the like. In various examples, packets may be redirected based at least in part on a 5-tuple identifier associated with packets, an SNI value associated with the packets, a DTLS session identifier associated with the packets, and the like. In at least one example, the packet redirect may be programmed across all other computing resources (e.g., all other backend nodes) of the networked computing environment. In this way, all packets that are associated with the VPN channel will be sent to the correct computing resource (in this case, the first computing resource) that is hosting the set of containers associated with the tenant. Additionally, or alternatively, in at least one example, the packet redirect may be performed by a top of rack switch or other hardware and/or software component of the networked computing environment.

In various examples, once redirects are fully established across all computing resources such that TLS and DTLS traffic terminates on the first computing resource, direct server return (DSR) may be used to send TLS and DTLS traffic back to the client device or node directly from the first computing resource since each computing resource shares the same loopback IP address. In at least one example, the tenant containers may be stopped or otherwise removed from the first computing resource. In this case, the data store may be updated such that the other computing resources are notified and can remove the automatic packet redirect from their programming.

The techniques described herein are generally applicable to any type of computing device or communication node of a networked computing environment. Additionally, the techniques are equally applicable to any type of communication protocol and packet structure. For instance, while various examples described herein are with respect to SSL VPNs, including TLS and DTLS, it is contemplated that the techniques of this disclosure are equally applicable to other communication protocols and VPN technologies, such as IPsec, Layer 2 Tunneling Protocol (L2TP), Point-to-Point Tunneling Protocol (PPTP), OpenVPN, Secure Shell (SSH), and the like.

According to the techniques described herein, by establishing packet redirects at various load balancers of one or more computing resources, reliability of traffic flows in a networked computing environment can be maintained. For instance, in networked computing environments in which an edge router is routing packets according to an ECMP routing algorithm, the techniques described herein assure the networked computing environment that latency and efficiency in packet routing can be achieved by ECMP routing, while still ensuring that VPN packets will arrive at the correct computing resource. Additionally, redirecting packets from a backend computing resource has benefits over state-of-the-art approaches by allowing for the use of DSR once a packet redirect is established, thus decreasing the amount of hops a packet must take to be sent from the computing resource to the client device and/or vice-versa.

Certain implementations and embodiments of the disclosure will now be described more fully below with reference to the accompanying figures, in which various aspects are shown. However, the various aspects may be implemented in many different forms and should not be construed as limited to the implementations set forth herein. For instance, while several of the exemplary figures are illustrated as showing SSL VPNs and TLS and DTLS traffic, it is contemplated that the techniques described herein are applicable to other communication protocols and VPN technologies. The disclosure encompasses variations of the embodiments, as described herein. Like numbers refer to like elements throughout.

Figure 1B:
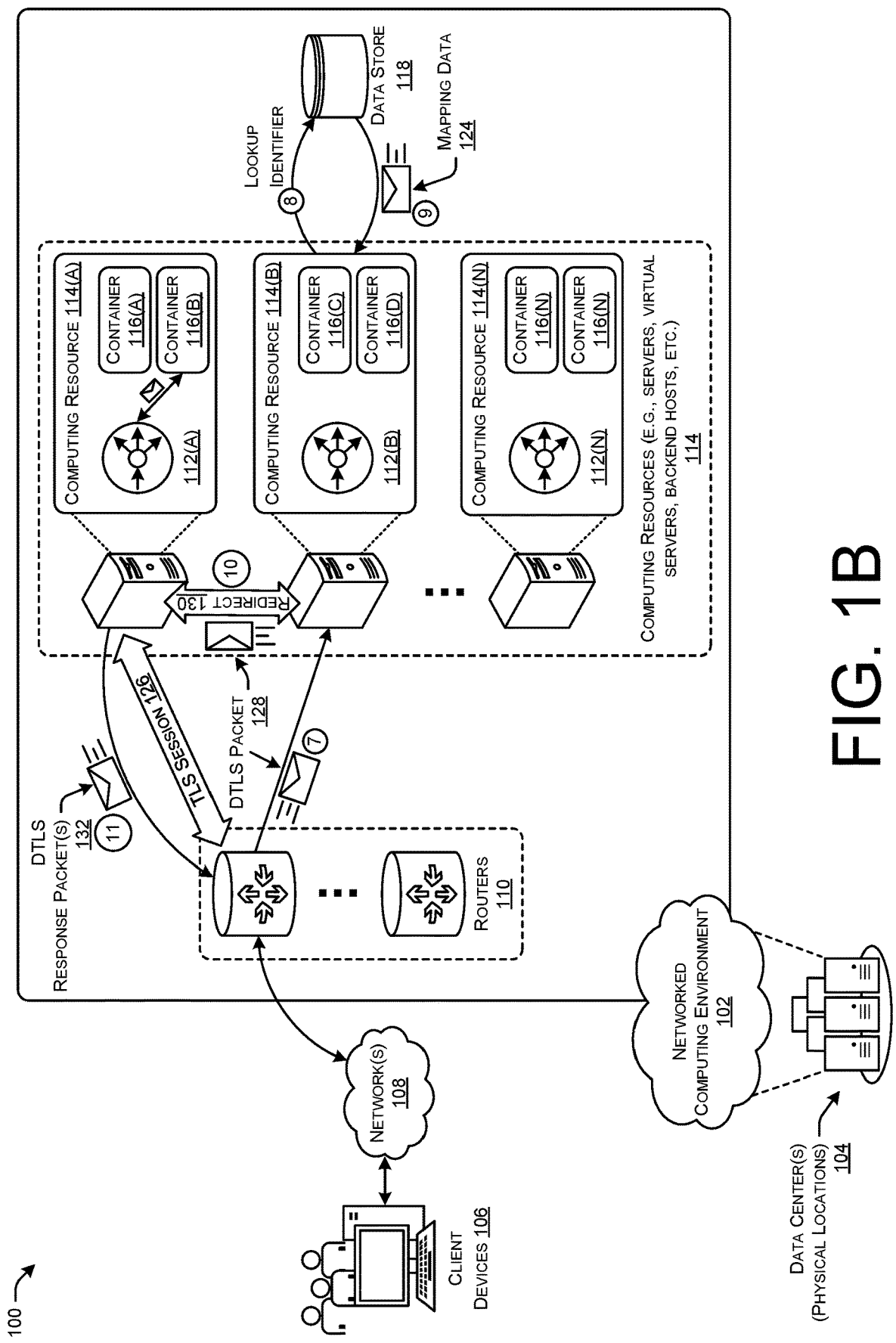

FIGS. 1A and 1B collectively illustrate a system-architecture diagram 100 of an example networked computing environment 102 that is performing load balancing of TLS and DTLS sessions with ECMP and host-local SNI. Generally, the networked computing environment 102 may include devices that are housed or located in one or more data centers 104 that may be located at different physical locations. For instance, the networked computing environment 102 may be supported by networks of devices in a public cloud computing platform, a private/enterprise computing platform, and/or any combination thereof. The one or more data centers 104 may be physical facilities or buildings located across geographic areas that are designated to store networked devices that are part of the networked computing environment 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples the devices in the networked computing environment 102 may not be located in explicitly defined data centers 104 and, rather, may be located in other locations or buildings.

The networked computing environment 102 may be accessible to client devices 106 over one or more networks 108, such as the Internet. The networked computing environment 102, and the networks 108, may each respectively include one or more networks implemented by any viable communication technology, such as wired and/or wireless modalities and/or technologies. The networked computing environment 102 and networks 108 may each include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)— both centralized and/or distributed—and/or any combination, permutation, and/or aggregation thereof. The networked computing environment 102 may include devices, virtual resources, or other nodes that relay packets from one network segment to another by nodes in the computer network.

In some examples, the networked computing environment 102 may provide, host, or otherwise support one or more application services for client devices 106 to connect to and use. The client devices 106 may comprise any type of device configured to communicate using various communication protocols (e.g., VPN, SSL, TLS, DTLS, and/or any other protocol) over the networks 108. For instance, the client device 106 may comprise a personal user device (e.g., desktop computers, laptop computers, phones, tablets, wearable devices, entertainment devices such as televisions, etc.), network devices (e.g., servers, routers, switches, access points, etc.), and/or any other type of computing device.

In some examples, the networked computing environment 102 may include a first layer of routers 110, which may be less reliable routers that route packets based on, for example, ECMP routing. For instance, the routers 110 may use ECMP, which is a strategy where next-hop packet forwarding to a single destination can occur over multiple "best paths" which tie for top place in routing metric calculations. Further, any routing strategy may be used by the routers 110, such as Open Shortest Path First (OSPF), Intermediate System to Intermediate System (ISIS), Enhanced Interior Gateway Routing Protocol (EIGRP), and/or Border Gateway Protocol (BGP) in conjunction with ECMP routing.

The routers 110 may balance traffic based on a hash of the network five-tuple in order to rout packets to one or more load balancers 112A-N (hereinafter referred to collectively as "load balancers 112," and where N represents any number greater than or equal to 1) that are running on the one or more computing resources 114A-N (hereinafter referred to collectively as "computing resources 114," and where N represents any number greater than or equal to 1) of the networked computing environment 102. The load balancers 112 may use a SNI routing algorithm to load balance and route packets to one or more containers stored on the computing resources 114, such as containers 116A-N (hereinafter referred to collectively as "containers 116," and where N represents any number greater than or equal to 1). The containers 116 may be necessary to authenticate and establish and SSL VPN.

The computing resources 114 of the networked computing environment 102 may comprise one or more of a computer, server computer, virtual machine, virtual server, router, switch (e.g., top of rack switch), gateway, communication node, backend node, load balancer, and the like. Additionally, a computing resource may comprise one or more computing resources. As shown, each computing resource 114 may include a load balancer, such as load balancers 112, as well as one or more containers 116. Each computing resource 114 may comprise one or more IP addresses, such as an anycast IP address that is the same across all computing resources, and/or a unique IP address that is used for communication between computing resources 114, including redirecting packets to a specific computing resource (e.g., redirecting packets from computing resource 114B to computing resource 114A). The computing resources 114 may be able to communicate with, as well as store and/or lookup data in the data store 118.

As shown in FIGS. 1A and 1B, various example steps of load balancing TLS and DTLS sessions with ECMP and host-local SNI are shown. This includes establishing a VPN connection for a tenant (in this example, client devices 106)

and establishing a packet redirect. At "1," TCP packet 120 is received by the load balancer 112A of the computing resource 114A after being routed by one of the routers 110 according to an ECMP routing algorithm. TCP packet 120, in this example, was sent by the client devices 106 via the networks 108. The TCP packet 120 may include a request to establish a VPN on the networked computing environment 102 and/or to establish a TCP and/or TLS session.

At "2," the load balancer 112A of the computing resource 114A negotiates the TCP session with the client devices 106. This may include sending one or more packets back and forth between the load balancer 112A and the client devices 106 until, at "3," a first SSL packet 122 is received by the load balancer 112A of the computing resource 114A. The SSL packet 122 may comprise a "ClientHello" message. Additionally, or alternatively, the SSL packet 122 may contain an identifier (e.g., SNI value, DTLS session identifier, 5-tuple, etc.) that maps the request to a specific tenant container, such as one of containers 116A-N.

Based at least in part on receiving the SSL packet 122, at "4," the load balancer 112A of the computing resource 114A may look up the identifier (e.g., the SNI Value, DTLS session identifier, 5-tuple, etc.) in the data store 118. Looking up the identifier may include sending a packet requesting to receive data associated with the identifier, accessing the data store 118 to look up the identifier, and the like. If the load balancer 112A of the computing resource 114A does not find the identifier stored in the data store 118—such as in exemplary FIG. 1A—then, at "5," the load balancer 112A and/or the computing resource 114A may dynamically establish one or more tenant containers (here, container 116B) that will be mapped to the identifier. Container 116B will be responsible for authenticating and establishing all SSL VPN connections from the client devices 106.

After the container 116B is dynamically established, at "6," the load balancer 112A of the computing resource 114A will send mapping data 124 to the data store 118 to be stored. The mapping data 124 may map, or otherwise associate, the identifier with at least one of the computing resource 114A and/or the container 116B. For instance, the mapping data 124 may indicate that an SNI value and/or a DTLS session identifier is associated with the computing resource 114A, and/or that a 5-tuple identifier is associated with the computing resource 114A. In some examples, the mapping data 124 is stored by the data store 118 and is available to be looked up by the computing resources 114. Additionally, or alternatively, in at least one example, the mapping data 124 is sent to each of the computing resources 114B-N such that each computing resource 114B-N is updated with the mapping data 124.

As shown in FIG. 1B, after at least steps "1-3" have been performed, a TLS session 126 is established between the computing resource 114A and the client devices 106. In some examples, incoming TLS traffic from the client devices 106 will be ECMP routed to the load balancer 112A of the computing resource 114A via the TLS session 126 based at least in part on a 5-tuple identifier associated with the incoming TLS traffic.

At "7," DTLS packet 128 is received by the load balancer 112B of the computing resource 114B after being routed by one of the routers 110 according to an ECMP routing algorithm. DTLS packet 128, in this example, was sent by the client devices 106 via the networks 108. In various examples, the DTLS packet 128 may have been ECMP routed to the load balancer 112B of the computing resource 114B based at least in part on a 5-tuple identifier associated with the DTLS packet 128. The DTLS packet 128 may include one or more identifies, such as a DTLS session identifier, a 5-tuple identifier, etc. Based at least in part on receiving the DTLS packet 128 containing the identifier, at "8," the load balancer 112B of the computing resource 114B may look up the identifier in the data store 118 to determine if any mappings are available for the identifier (e.g., whether the identifier is mapped to another backend host, such as computing resource 114A). Looking up the identifier may include sending a packet requesting to receive data associated with the identifier, accessing the data store 118 to look up the identifier, and the like. At "9," since the mapping data 124 was stored in the data store 118 by the load balancer 112A of the computing resource 114A, the load balancer 112B of the computing resource 114B may receive the mapping data 124 from the data store 118. The mapping data 124 may include data indicating that the identifier (e.g., the SNI value, the DTLS session identifier, the 5-tuple identifier, etc.) is associated with the computing resource 114A.

Based at least in part on receiving the mapping data 124, at "10," the load balancer 112B of the computing resource 114B may establish a packet redirect 130 to redirect the DTLS packet 128 to the load balancer 112A of the computing resource 114A. In some examples, the packet redirect 130 may further be established across all computing resources 114 of the networked computing environment 102 such that future DTLS packets are automatically sent to the load balancer 112A of computing resource 114A. In this way, all SSL VPN traffic, including TLS and DTLS, can be authenticated and processed by tenant container 116B of the computing resource 114A. Additionally, at "11," DTLS response packet(s) 132 can be sent directly from the load balancer 112A of computing resource 114A to the routers 110 such that the DTLS response packet(s) 12 can be routed back to the client devices 106 via the network 108.

Figure 2:
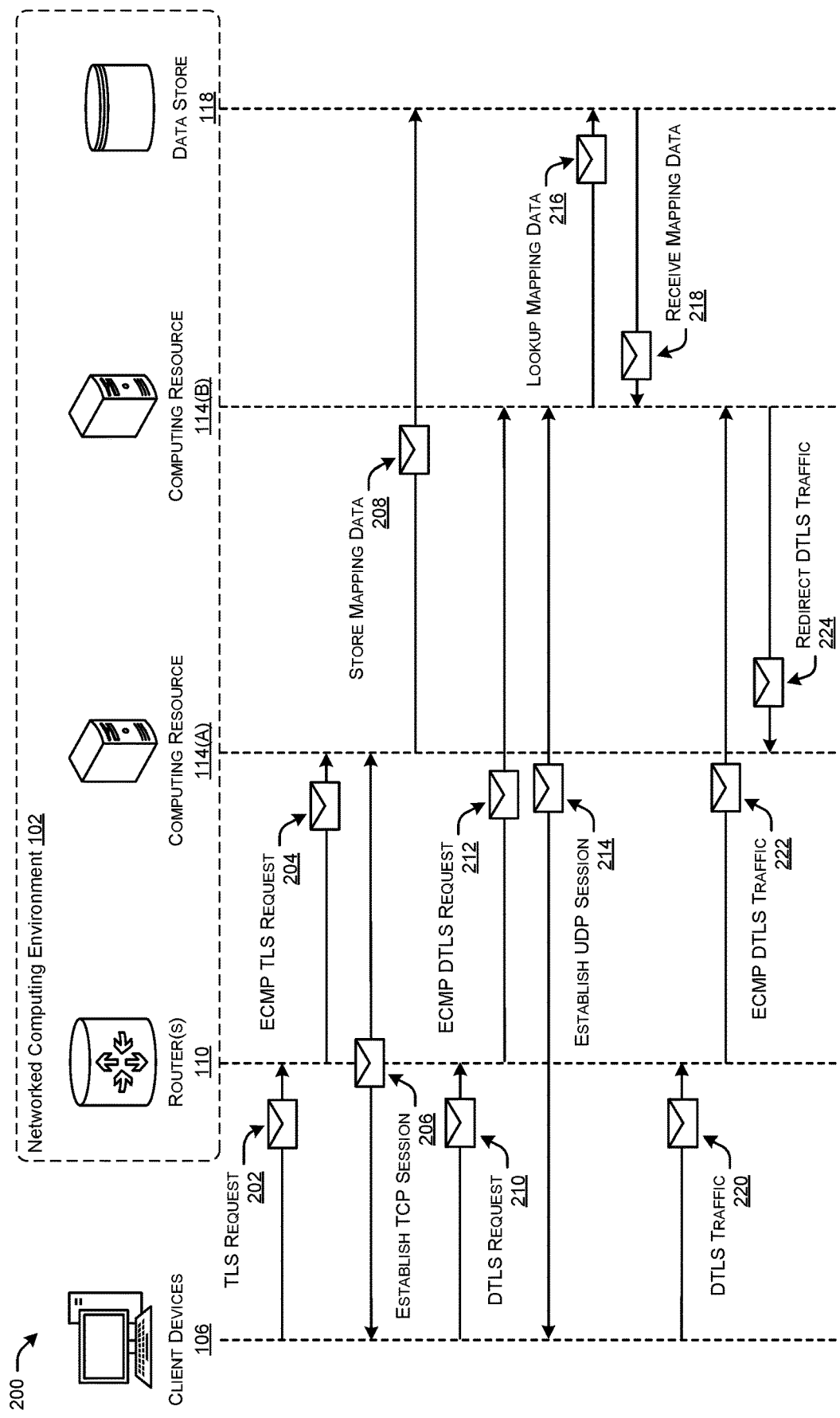
FIG. 2 illustrates a data flow diagram of an example traffic flow associated with load balancing TLS and DTLS sessions with ECMP and host-local SNI.

FIG. 2 illustrates a data flow diagram of an example traffic flow 200 associated with load balancing TLS and DTLS sessions with ECMP and host-local SNI. As shown, the traffic flow 200 includes various hardware and/or software resources, such as a client devices 106, router(s) 110, computing resources 114A and 114B, and data store 118.

The example traffic flow 200 begins at 202 with the client devices 106 sending a TLS request to the router(s) 110 of the networked computing environment. The TLS request may comprise a TCP packet indicating a request to establish a TCP and/or TLS session. Next, at 204, the router(s) 110 will route the TLS request to a load balancer of the computing resource 114A according to an ECMP routing algorithm. At 206, the load balancer of the computing resource 114A may establish the TCP session by negotiating the communication session with the client devices 106. As part of establishing the TCP session, the load balancer of the computing resource 114A may negotiate the communication session until the load balancer receives a first SSL packet containing one or more identifiers, such as a SNI value, 5-tuple, or DTLS session identifier.

At 208, the load balancer of the computing resource 114A may store mapping data in the data store 118. The mapping data may indicate an association between the one or more identifiers and the computing resource 114A. In some examples, prior to storing the mapping data, the load balancer of the computing resource 114A may look up the identifier in the data store 118 to make sure that the identifier is not already associated with another computing resource.

At 210, the client devices 106 may send a DTLS request to the router(s) 110 in order to establish a DTLS session. In response to receiving the DTLS request, at 212, the router(s) 110 may route the DTLS request to the computing resource 114B according to an ECMP routing algorithm. A load balancer of the computing resource 114B may receive the DTLS request packet and, at 214, proceed to establish the DTLS session. In establishing the DTLS session, the load balancer of the computing resource 114B may communicate packets back and forth with the client devices 106 until the load balancer receives a packet that contains an identifier, such as the SNI value, DTLS session identifier, the 5-tuple, etc.

Based at least in part on receiving the packet containing the identifier, at 216 the load balancer of the computing resource 114B may look up mapping data (e.g., the identifier) in the data store 118. For instance, the load balancer of the computing resource 114B may lookup a DTLS session identifier received during the DTLS session negotiation. At 218, the load balancer of the computing resource 114B may receive the mapping data from the data store 118. The mapping data may indicate that the identifier is associated with the computing resource 114A and/or a tenant container that is established on the computing resource 114A.

At 220, the router(s) 110 may receive additional DTLS traffic from the client devices 106 and, at 222, may ECMP route the DTLS traffic to the computing resource 114B. In some examples, the router(s) 110 may route the DTLS traffic to the computing resource 114B based at least in part on a 5-tuple identifier associated with the DTLS traffic. At 224, the load balancer of the computing resource 114B may redirect the DTLS traffic to the load balancer of the computing resource 114A. In various examples, after receiving the mapping data above in step 218, the load balancer of the computing resource 114B may have established a packet redirect to automatically redirect DTLS packets to the computing resource 114A based at least in part on a 5-tuple identifier or other identifier associated with the DTLS packets.

Figure 4:
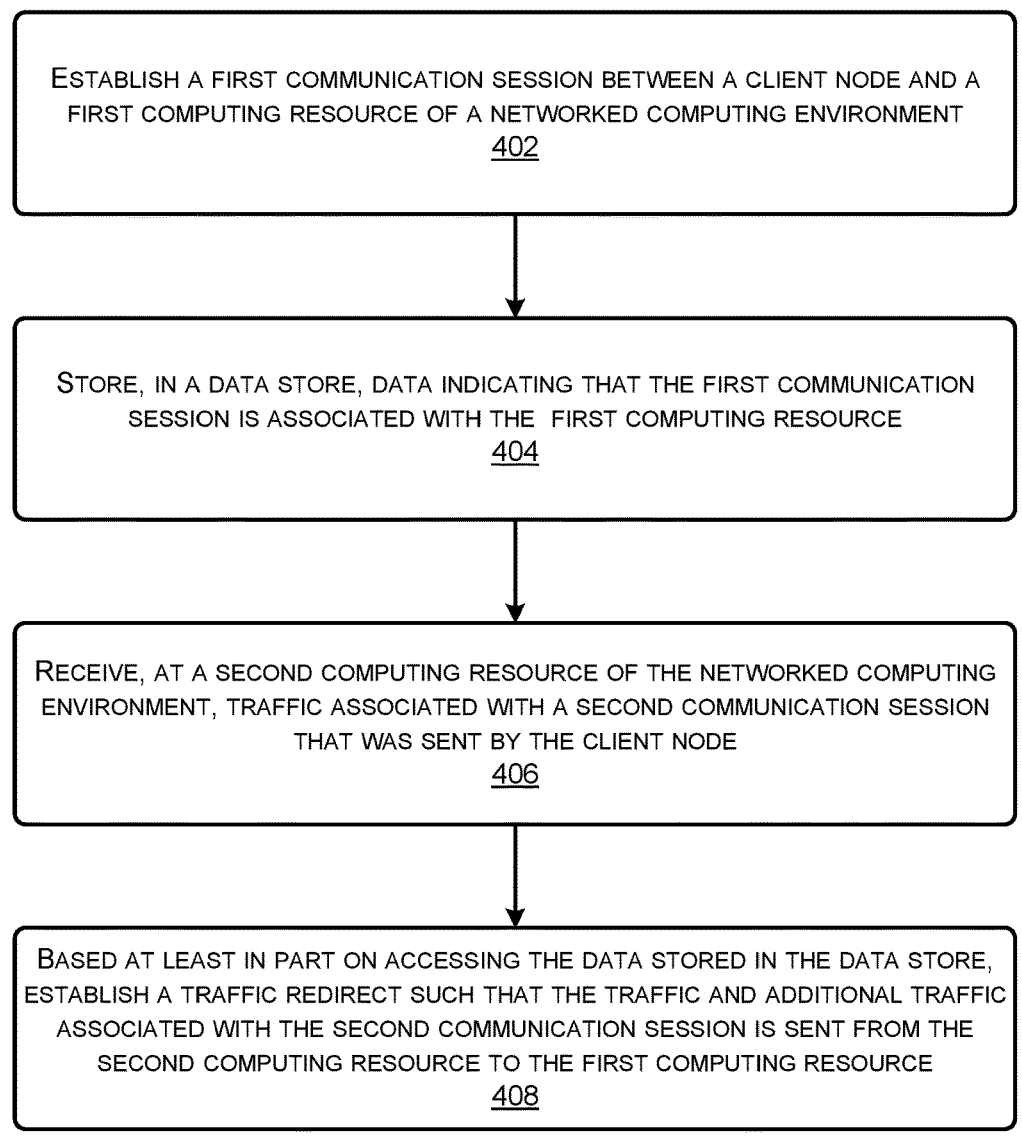
FIG. 4 illustrates another flow diagram of an example method for establishing a packet redirect for load balancing TLS and DTLS sessions

FIGS. 3 and 4 illustrate flow diagrams of example methods that illustrate various aspects of the techniques of this disclosure. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

FIG. 3 illustrates a flow diagram of an example method 300 for establishing a packet redirect for load balancing TLS and DTLS sessions. Some or all of the various operations shown in example method 300 may be performed by the various hardware and/or software resources described above in FIGS. 1A, 1B, and 2, such as the computing resources 114, the load balancers 112, and so on.

The method 300 begins at operation 302, during which a first communication session is established between a client device and one or more first computing resources of a networked computing environment, wherein the one or more first computing resources are hosting one or more containers associated with the client device. In some examples, the one or more first computing resources may include a load balancer as part of its architecture and may be hosting one or more containers associated with one or more tenants, including the client device. The load balancer may route packets to the one or more containers according to an SNI load balancing algorithm (e.g., host-local SNI routing). The first communication session may comprise a TLS session, TCP session, DTLS session, UDP session, Internet Protocol Security (IPsec) session, and the like. In at least one example, the first communication session comprises a TLS session.

In some examples, establishing the first communication session may include receiving, at the one or more first computing resource, a first packet that was sent by the client device. The first packet may comprise a TCP packet indicating a request to establish a TLS session, or may comprise a UDP packet indicating a request to establish a DTLS session. Additionally, the first packet may have been routed to the one or more first computing resources by a routing layer (e.g., data center edge router) of the networked computing environment according to an ECMP routing algorithm. In at least one example, the first packet may have been routed to the one or more first computing resources based at least in part on a 5-tuple identifier associated with the first packet. In some examples, establishing the first communication session may include negotiating the first communication session (e.g., sending one or more packets back and forth between the client device and the load balancer of the one or more first computing resources) until a first Secure Sockets Layer (SSL) packet (e.g., ClientHello message) is received by the load balancer. The first SSL packet may, in at least some examples, include an identifier associated with at least one of the client device, client node, and/or the first communication session. For instance, the first SSL packet may include at least a Server Name Identification (SNI) identifier (e.g., SNI value), a DTLS session identifier (e.g., X-DTLS-Session-ID), and/or a 5-tuple identifier.

At 304, the method includes storing, in a data store associated with the networked computing environment, mapping data indicating that the first communication session is associated with the one or more first computing resources. In various examples, the mapping data may include one or more of a Server Name Identification (SNI) identifier (e.g., SNI value), a DTLS session identifier (e.g., X-DTLS-Session-ID), and/or a 5-tuple identifier. Additionally, the mapping data may map or otherwise associate at least one of the one or more identifiers mentioned above (e.g., SNI value, X-DTLS-Session-ID, 5-tuple, etc.) with the one or more first computing resources.

At 306, the method includes receiving, at one or more second computing resources of the networked computing environment and from a router associated with the networked computing environment, one or more packets of a second communication session that were sent by the client device. In some examples, the second communication session may comprise a DTLS session, and the one or more packets may have been routed to the one or more second computing resources by a routing layer (e.g., data center edge router) of the networked computing environment according to an ECMP routing algorithm. The DTLS session may be part of a VPN that the networked computing environment is hosting for the client device. In at least one example, the one or more packets may have been routed to the one or more second computing resources based at least in part on a 5-tuple identifier associated with the one or more packets.

At 308, the method includes identifying, by the one or more second computing resources and based at least in part on the mapping data, that the one or more packets are to be redirected to the one or more first computing resources. For instance, the load balancer of the one or more second computing resources may, in response to receiving the one or more packets of the second communication session, lookup an identifier (e.g., SNI value, 5-tuple, X-DTLS-Session-ID, mapping data, etc.) in the data store. Because, as noted above at step 304, the mapping data was already stored in the data store by the load balancer of the one or more first computing resources, the load balancer of the one or more second computing resources will understand that the packets are to be redirected to the one or more first computing resources since the mapping data is associated with (e.g., mapped to) the one or more first computing resources.

At 310, the method includes sending the one or more packets to the one or more first computing resources. Sending the one or more packets to the one or more first computing resources may be based at least in part on the mapping data. In some examples the one or more second computing resources and/or the load balancer of the one or more second computing resources may establish a packet redirect to automatically send the one or more packets of the second communication session to the one or more first computing resources. The packet redirect may be setup locally on the one or more second computing resources using something such as an Internet Protocol Virtual Server (IPVS), Linux Berkeley Packet Filter (BPF), and the like. In various examples, packets may be redirected based at least in part on a 5-tuple identifier associated with packets, an SNI value associated with the packets, a DTLS session identifier associated with the packets, and the like. In at least one example, the packet redirect may be programmed across all other computing resources (e.g., all other backend nodes) of the networked computing environment. In this way, all packets that are associated with the VPN being hosted by the one or more first computing resources will be sent to the correct computing resource (in this case, the one or more first computing resources) that is hosting the set of containers associated with the tenant.

FIG. 4 illustrates another flow diagram of an example method 400 for establishing a packet redirect for load balancing TLS and DTLS sessions. Some or all of the various operations shown in example method 400 may be performed by the various hardware and/or software resources described above in FIGS. 1A, 1B, and 2, such as the computing resources 114, the load balancers 112, and so on.

At 402, the method 400 includes establishing a first communication session between a client node and a first computing resource of a networked computing environment. In some examples, the first computing resource may include a load balancer as part of its architecture and may be hosting one or more containers associated with one or more tenants, including the client device. The load balancer may route packets to the one or more containers according to an SNI load balancing algorithm (e.g., host-local SNI routing). The first communication session may comprise a TLS session, TCP session, DTLS session, UDP session, Internet Protocol Security (IPsec) session, and the like. In at least one example, the first communication session comprises a TLS session.

In some examples, establishing the first communication session may include receiving, at the first computing resource, a first packet that was sent by the client device. The first packet may comprise a TCP packet indicating a request to establish a TLS session, or may comprise a UDP packet indicating a request to establish a DTLS session. Additionally, the first packet may have been routed to the first computing resource by a routing layer (e.g., data center edge router) of the networked computing environment according to an ECMP routing algorithm. In at least one example, the first packet may have been routed to the first computing resource based at least in part on a 5-tuple identifier associated with the first packet. In some examples, establishing the first communication session may include negotiating the first communication session (e.g., sending one or more packets back and forth between the client device and the load balancer of the first computing resource) until a first Secure Sockets Layer (SSL) packet (e.g., ClientHello message) is received by the first computing resource. The first SSL packet may, in at least some examples, include an identifier associated with at least one of the client device, client node, and/or the first communication session. For instance, the first SSL packet may include at least a Server Name Identification (SNI) identifier (e.g., SNI value), a DTLS session identifier (e.g., X-DTLS-Session-ID), and/or a 5-tuple identifier.

At 404, the method 400 includes storing, in a data store, data indicating that the first communication session is associated with the first computing resource. The data may, in various examples, comprise mapping data and/or one or more identifiers. In various examples, the data may include one or more of a Server Name Identification (SNI) identifier (e.g., SNI value), a DTLS session identifier (e.g., X-DTLS-Session-ID), and/or a 5-tuple identifier. Additionally, the data may map or otherwise associate at least one of the one or more identifiers mentioned above (e.g., SNI value, X-DTLS-Session-ID, 5-tuple, etc.) with the first computing resource and/or one or more tenant containers associated with the client device that are being hosted by the first computing resource.

At 406, the method 400 includes receiving, at a second computing resource of the networked computing environment, traffic associated with a second communication session that was sent by the client node. In some examples, the second communication session may comprise a DTLS session, TLS session, UDP session, TCP session, and the like. The traffic may have been routed to the one or more second computing resources by a routing layer (e.g., data center edge router) of the networked computing environment according to an ECMP routing algorithm. The DTLS session may be part of a VPN that the networked computing environment is hosting for the client device. In at least one example, the traffic may comprise one or more packets that may have been routed to the second computing resource based at least in part on a 5-tuple identifier associated with the one or more packets.

At 408, the method 400 includes establishing a traffic redirect, based at least in part on accessing the data stored in the data store, such that the traffic and additional traffic associated with the second communication session is sent from the second computing resource to the first computing resource. In some examples the traffic redirect may enable the second computing resource to automatically send the traffic of the second communication session to the first computing resource. The traffic redirect may be setup locally on the second computing resource using something such as an Internet Protocol Virtual Server (IPVS), Linux Berkeley Packet Filter (BPF), and the like. In various examples, traffic may be redirected based at least in part on a 5-tuple identifier associated with packets, an SNI value associated with the packets, a DTLS session identifier associated with the packets, and the like. In at least one example, the traffic redirect may be programmed across all other computing resources (e.g., all other backend nodes) of the networked computing environment. In this way, all traffic that is associated with the VPN being hosted by the first computing resource will be sent to the correct computing resource (in this case, the first computing resource) that is hosting the set of containers associated with the tenant.

Figure 5:
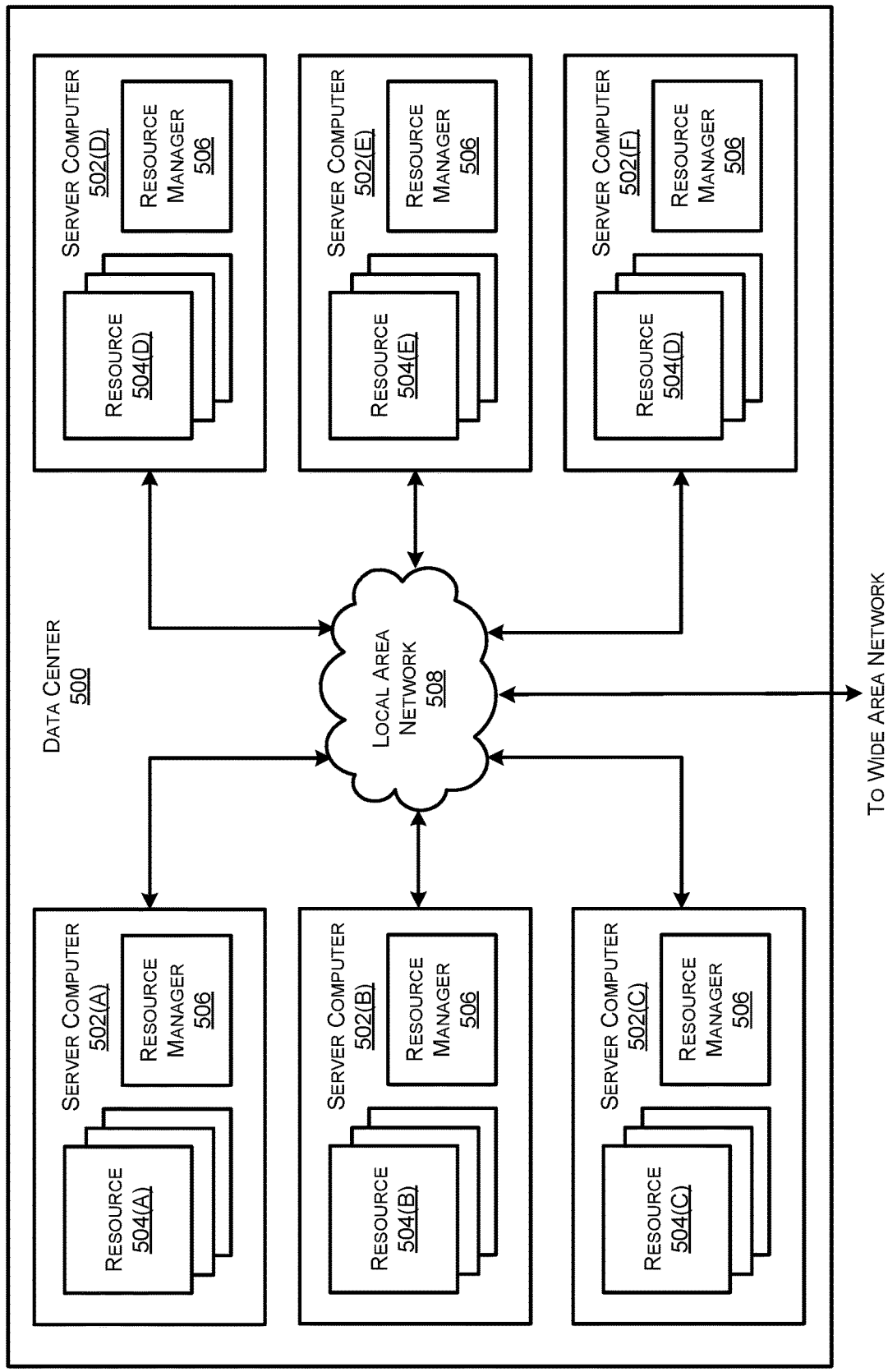
FIG. 5 illustrates a computing system diagram illustrating a configuration for a data center that can be utilized to implement aspects of the technologies disclosed herein.

FIG. 5 illustrates a computing system diagram illustrating a configuration for a data center 500 that can be utilized to implement aspects of the technologies disclosed herein. The example data center 500 shown in FIG. 5 includes several server computers 502A-502F (which might be referred to herein singularly as "a server computer 502" or in the plural as "the server computers 502") for providing computing resources. In some examples, the resources and/or server computers 502 may include, or correspond to, the any type of networked device described herein. Although described as servers, the server computers 502 may comprise any type of networked device, such as servers, switches, routers, hubs, bridges, gateways, modems, repeaters, access points, etc.

The server computers 502 can be standard tower, rack-mount, or blade server computers configured appropriately for providing computing resources. In some examples, the server computers 502 may provide computing resources 504 including data processing resources such as VM instances or hardware computing systems, database clusters, computing clusters, storage clusters, data storage resources, database resources, networking resources, VPNs, and others. Some of the servers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single server computer 502. Server computers 502 in the data center 500 can also be configured to provide network services and other types of services.

In the example data center 500 shown in FIG. 5, an appropriate LAN 508 is also utilized to interconnect the server computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the server computers 502A-502F in each data center 500, and, potentially, between computing resources in each of the server computers 502. It should be appreciated that the configuration of the data center 500 described with reference to FIG. 5 is merely illustrative and that other implementations can be utilized.

In some examples, the server computers 502 and or the resources 504 may each execute/host one or more tenant containers and/or virtual machines to perform techniques described herein.

In some instances, the data center 500 may provide computing resources, like tenant containers, VM instances, VPN instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like tenant containers and VM instances, data storage resources, networking resources, data communication resources, network services, VPN instances, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
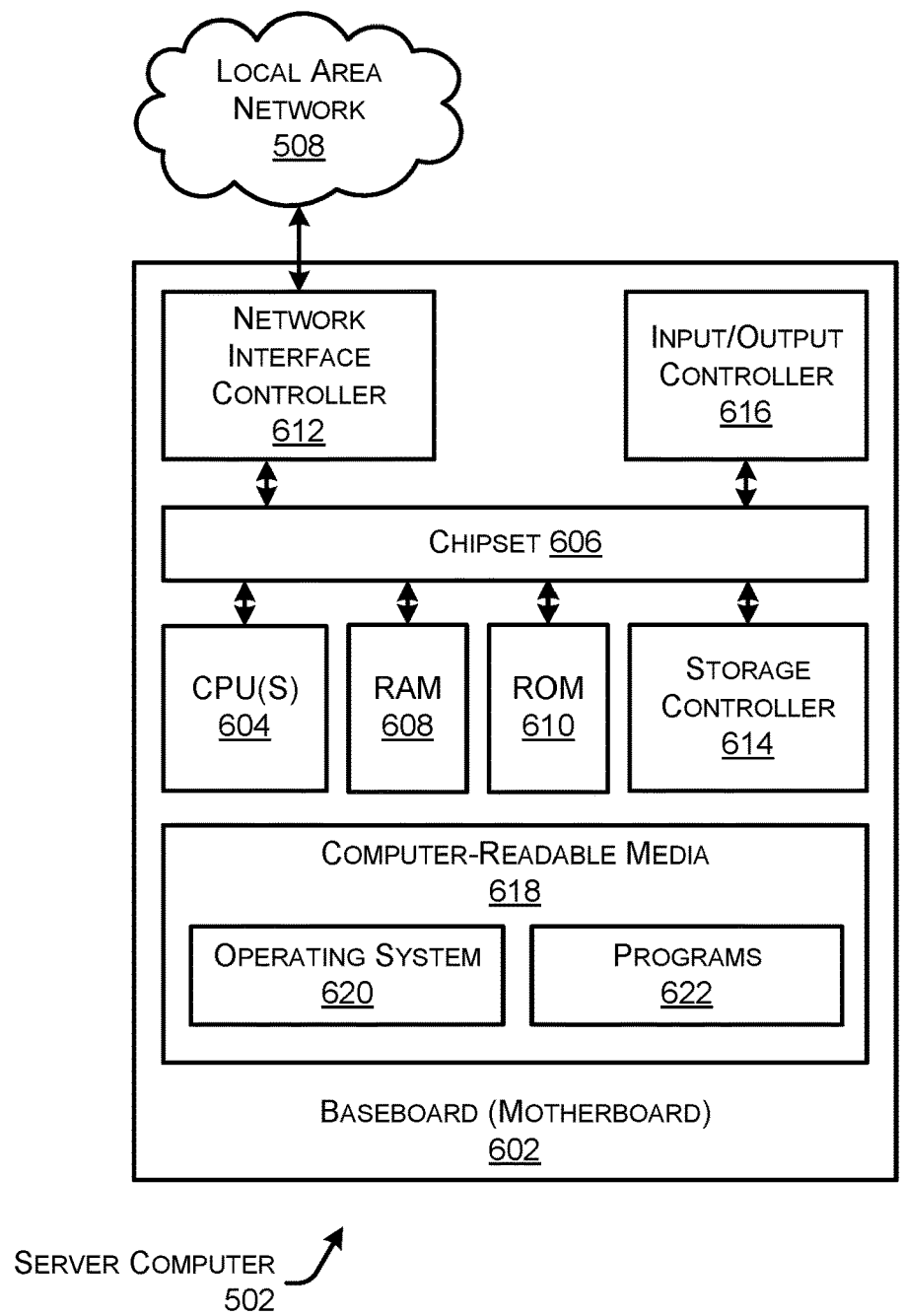
FIG. 6 illustrates a computer architecture diagram showing an example computer hardware architecture for implementing a computing device that can be utilized to implement aspects of the various technologies presented herein.

FIG. 6 illustrates a computer architecture diagram showing an example computer hardware architecture 600 for implementing a computing device that can be utilized to implement aspects of the various technologies presented herein. The computer hardware architecture 600 shown in FIG. 6 illustrates a conventional server computer 502, computing resource 114, network device (e.g., router 110, load balancer 112, data store 118, etc.), workstation, desktop computer, laptop, tablet, network appliance, e-reader, smartphone, or other computing device, and can be utilized to execute any of the software components presented herein. The computer 600 may, in some examples, correspond to a network device 102 described herein, and may comprise networked devices such as servers, switches, routers, hubs, bridges, gateways, modems, repeaters, access points, etc.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 106. The chipset 606 can include functionality for providing network connectivity through a Network Interface Controller (NIC) 612, such as a gigabit Ethernet adapter. The NIC 612 is capable of connecting the computer 600 to other computing devices over the network 106. It should be appreciated that multiple NICs 612 can be present in the computer 600, connecting the computer to other types of networks and remote computer systems. In some examples, the NIC 612 may be configured to perform at least some of the techniques described herein, such as packet redirects and/or other techniques described herein.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the network 106 and or any components included therein, may be supported by one or more devices similar to computer 600. Stated otherwise, some or all of the operations performed by the network 106, and or any components included therein, may be performed by one or more computer devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-4. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or might utilize an architecture completely different than that shown in FIG. 6.

As described herein, the computer 600 may comprise one or more of a client device 106 or a network device (e.g., server computer 502, computing resource 114, router 110, etc.). The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the client devices 106 and computing resources 114 The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for determining connectivity in multi-hop paths using BFD Echo packet(s). The programs 622 may enable the computing resources 114 and/or the load balancers 112 of the computing resources 114 to perform various operations.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
receiving a packet of a secure communication flow that is being sent to a first backend node, the packet including a server name indication (SNI) value;
determining that the secure communication flow is to be terminated at a second backend node that is different than the first backend node based at least in part on a container associated with the SNI value running on the second backend node; and
based at least in part on determining that the secure communication flow is to be terminated at the second backend node, establishing a redirect to forward packets of the secure communication flow from the first backend node to the second backend node.

2. The method of claim 1, further comprising determining a network 5-tuple associated with the packet, wherein establishing the redirect comprises storing, in a routing table, an indication that packets including the network 5-tuple are to be forwarded to the second backend node.

3. The method of claim 1, wherein determining that the secure communication flow is to be terminated at the second backend node comprises determining that a first portion of traffic of the secure communication flow is terminating at the second backend node, the first portion of the traffic originating from a same client device as the packet.

4. The method of claim 3, wherein the first portion of the traffic is encrypted according to a different protocol than the packet and the packets.

5. The method of claim 1, wherein determining that the secure communication flow is to be terminated at the second backend node comprises determining that a first mapping between the SNI value and the second backend node is stored in a database.

6. The method of claim 5, wherein the first mapping is stored in the database by the second backend node, the database further storing (i) a second mapping between the second backend node and a network 5-tuple associated with the secure communication flow and (ii) a third mapping between the second backend node and a session identifier associated with the secure communication flow.

7. The method of claim 1, wherein establishing the redirect comprises storing, in a routing table, an indication that packets including a network 5-tuple associated with the packet are to be forwarded to the second backend node.

8. The method of claim 1, further comprising determining that the container associated with the SNI value is running on the second backend node.

9. A system associated with a networking device, the system comprising:
one or more processors; and
one or more non-transitory computer-readable media storing instructions that, when executed, cause the one or more processors to perform operations comprising:
receiving a packet of a secure communication flow that is to be sent to a first backend node, the packet including a server name indication (SNI) value;
determining that the secure communication flow is to be terminated at a second backend node that is different than the first backend node based at least in part on a container associated with the SNI value running on the second backend node; and
based at least in part on determining that the secure communication flow is to be terminated at the second backend node, establishing a redirect to forward packets of the secure communication flow from the first backend node to the second backend node.

10. The system of claim 9, the operations further comprising determining a network 5-tuple associated with the packet, wherein establishing the redirect comprises storing, in a routing table, an indication that packets including the network 5-tuple are to be forwarded to the second backend node.

11. The system of claim 9, wherein determining that the secure communication flow is to be terminated at the second backend node comprises determining that a first portion of traffic of the secure communication flow is terminating at the second backend node, the first portion of the traffic originating from a same client device as the packet.

12. The system of claim 11, wherein the first portion of the traffic is encrypted according to a different protocol than the packet and the packets.

13. The system of claim 9, wherein determining that the secure communication flow is to be terminated at the second backend node comprises determining that a first mapping between the SNI value and the second backend node is stored in a database.

14. The system of claim 9, wherein establishing the redirect comprises storing, in a routing table, an indication that packets including a network 5-tuple associated with the packet are to be forwarded to the second backend node.

15. The system of claim 9, the operations further comprising determining that the container associated with the SNI value is running on the second backend node.

16. One or more non-transitory computer-readable media storing instructions that, when executed, cause one or more processors to perform operations comprising:
   receiving a packet of a secure communication flow that is being sent to a first backend node, the packet including a server name indication (SNI) value;
   determining that the secure communication flow is to be terminated at a second backend node that is different than the first backend node based at least in part on a container associated with the SNI value running on the second backend node; and
   based at least in part on determining that the secure communication flow is to be terminated at the second backend node, establishing a redirect to forward packets of the secure communication flow from the first backend node to the second backend node.

17. The one or more non-transitory computer-readable media of claim 16, the operations further comprising determining a network 5-tuple associated with the packet, wherein establishing the redirect comprises storing, in a routing table, an indication that packets including the network 5-tuple are to be forwarded to the second backend node.

18. The one or more non-transitory computer-readable media of claim 16, wherein determining that the secure communication flow is to be terminated at the second backend node comprises determining that a first portion of traffic of the secure communication flow is terminating at the second backend node, the first portion of the traffic originating from a same client device as the packet.

19. The one or more non-transitory computer-readable media of claim 18, wherein the first portion of the traffic is encrypted according to a different protocol than the packet and the packets.

20. The one or more non-transitory computer-readable media of claim 16, the operations further comprising determining that the container associated with the SNI value is running on the second backend node.

\* \* \* \* \*